June 12, 1962 R. J. SARGENT 3,039,020
AUTOMATIC LIGHT CONTROL
Filed June 17, 1959
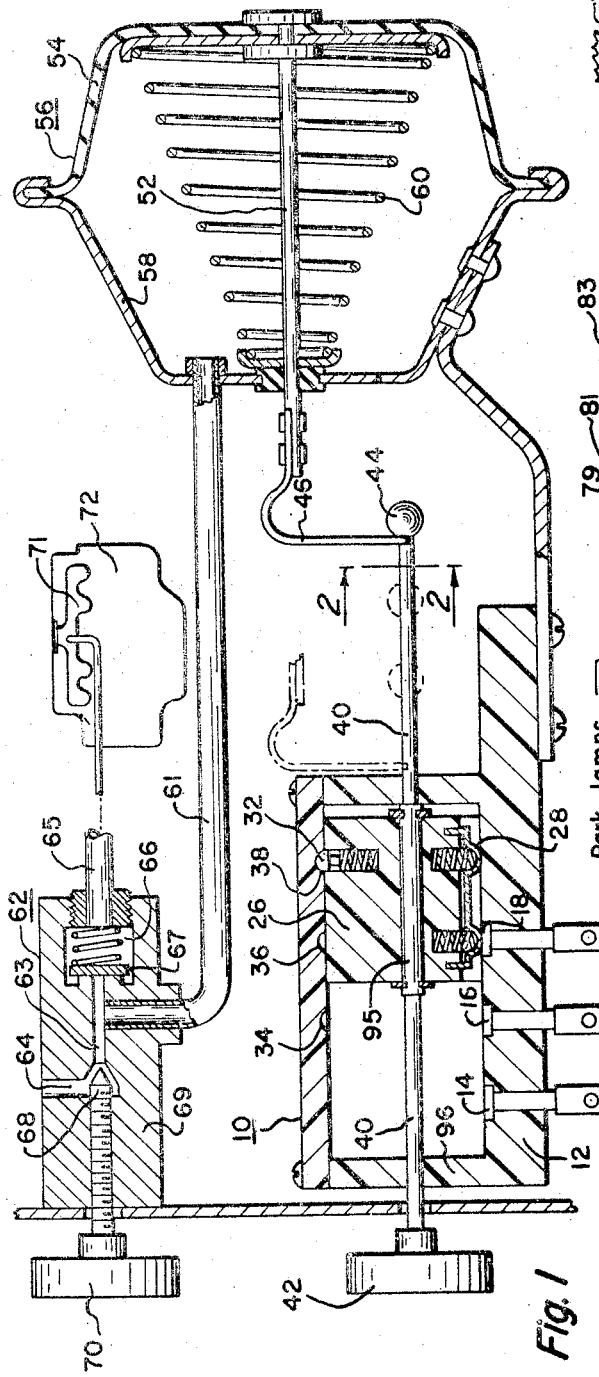
Fig.1
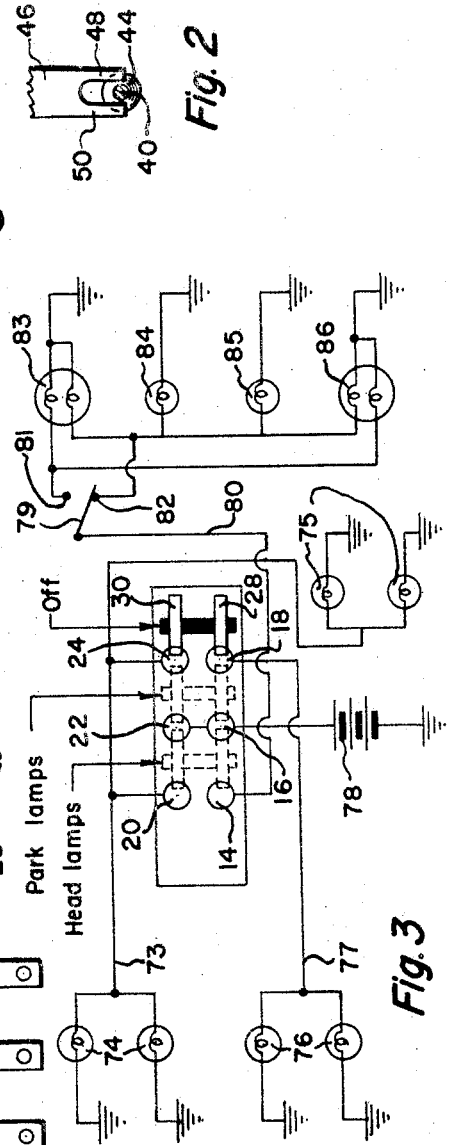
Fig.2
Fig.3
INVENTOR.
Ronald J. Sargent
BY
C. R. Meland
His Attorney

United States Patent Office 3,039,020
Patented June 12, 1962

3,039,020
AUTOMATIC LIGHT CONTROL
Ronald J. Sargent, Clio, Mich., assignor to General Motors Corporation, Detroit, Mich., a corporation of Delaware
Filed June 17, 1959, Ser. No. 820,918
6 Claims. (Cl. 315—80)

This invention relates to automatic light controls for motor vehicles and the like.

One of the objects of this invention is to provide a lighting system for a motor vehicle wherein simple and efficient apparatus is provided for controlling the energization of the lamps of the motor vehicle in accordance with engine operation. In accomplishing this object, means are provided for causing the lamps to be extinguished after the engine is turned off and for causing certain lamps to become incandescent after the engine is started.

Another object of this invention is to provide a lighting system for a motor vehicle wherein the lamps of the system are controlled by a vacuum motor that operates an electric switch.

Still another object of this invention is to provide a lighting system for a motor vehicle wherein an electric switch controls the energization of the lamps of the motor vehicle and wherein the switch is operated from a first position to a second position in response to a starting of the motor vehicle engine.

A further object of this invention is to provide a lighting system for a motor vehicle wherein an electric switch controls the energization of the lamps of the motor vehicle and wherein this switch is actuated by a vacuum motor having a releasable connection with the movable part of the switch.

A further object of this invention is to provide a lighting control system for a motor vehicle wherein the energization of the lamps of the vehicle may be manually controlled but wherein the lamps are caused to become extinguished after a predetermined time delay following a shut down condition of the engine of the vehicle.

Further objects and advantages of the present invention will be apparent from the following description, reference being had to the accompanying drawings wherein preferred embodiments of the present invention are clearly shown.

In the drawings:

FIGURE 1 is a view illustrating the electric switch and vacuum motor of this invention and illustrating the releasable connection between the switch and vacuum motor.

FIGURE 2 is a view taken along line 2—2 of FIGURE 1.

FIGURE 3 is a circuit diagram illustrating the various lamps of a motor vehicle and illustrating the connection of these lamps with the switch of this invention.

Referring now to the drawings and more particularly to FIGURE 1, an electric switch generally designated by reference numeral 10 is illustrated. This switch has a base designated by reference numeral 12 which carries fixed contacts designated by reference numerals 14, 16, 18, 20, 22 and 24. The contacts 20, 22 and 24 are not illustrated in FIGURE 1 but are clearly shown in FIGURE 3 and are supported in base 12 in a fashion identical with the supporting of contacts 14, 16 and 18. The switch 10 has a movable contact carrier formed of insulating material and designated by reference numeral 26 which carries a pair of contactors 28 and 30 that are spring-biased into engagement with the base 12 and into engagement with the contacts which the base carries. The contact carrier or support 26 carries a spring-biased detent 32 which becomes engaged within detent recesses 34, 36 and 38 at various positions of the movable member 26. The movable member 26 is fixed to a shaft or rod 40 which carries an actuating knob 42.

The rod 40 has an end 44 which is of a spherical shape that cooperates with an actuator member 46 formed of spring metal material. The member 46 is formed with a pair of fingers 48 and 50 which cooperate with the spherical end portion 44 of the rod 40 in a manner to be more fully described hereinafter.

The actuator member 46 is connected with a rod 52 which, in turn, is connected with a flexible diaphragm 54 of a vacuum motor generally designated by reference numeral 56. The diaphragm 54 is fixed to a metal body portion 58 or housing of the vacuum motor and the diaphragm is normally biased to the position illustrated in FIGURE 1 by a spring 60 that is interposed between the housing 58 and the diaphragm 54. It will be understood that when vacuum pressure is applied to the chamber formed by the housing 58 and the diaphragm 54 the diaphragm will move leftwardly against the bias of spring 50 to likewise move the actuating member 46 to the left.

The vacuum motor 56 is connected with a pipe designated by reference numeral 61 and this pipe is connected with a valve designated in its entirety by reference numeral 62. The valve 62 has a chamber 63 which is connected to atmosphere via passage 64 and which is connected to a pipe 65 through a chamber 66. The chamber 66 contains a spring-biased check valve 67 which maintains the chamber 63 and pipe 65 disconnected whenever the pipe 65 is not connected with vacum. The chamber 63 and passage 64 are connected through an opening that is controlled by a needle valve member designated by reference numeral 68. The valve member 68 is threaded into the housing 69 of the valve member and may be rotated by manual actuation of knob 70.

The pipe 65 is connected with the intake manifold 71 of an internal combustion engine designated by reference numeral 72. It will be understood that the pipe 65 is connected with vacuum whenever the engine 72 is operating and this vacuum will cause the check valve 67 to become unseated to connect the interior of vacuum motor 56 with vacuum pressure whenever the engine is running.

Referring now more particularly to FIGURE 3, it is seen that fixed contacts 20 and 24 are connected with a lead wire 73 which is, in turn, connected with taillamps 74 and with the panel lamps for the vehicle designated by reference numeral 75. The taillamps 74 and the panel lamps 75 have their opposite sides connected to ground as shown. The terminal 18 of the electric switch 10 is connected with the parking lamps 76 via a lead 77. The terminals 16 and 22 of the electric switch are connected to one side of a storage battery designated by reference numeral 78, the opposite side of the storage battery being connected to ground as shown. The terminal 14 is connected to one side of a dimmer switch having a movable contact 79 via a lead 80. The movable contact 79 may be selectively connected with fixed contacts 81 and 82 which are connected with lamps 83, 84, 85, and 86 in a manner illustrated in the drawing. The lamps 83, 84, 85 and 86 are all head lamps and it is seen that lamps 83 and 86 each contain two filaments. When the dimmer switch is in the position illustrated in FIGURE 3, one filament of lamps 83 and 86 will be energized while both lamps 84 and 85 are energized. When the dimmer switch contact 79 is shifted into engagement with contact 81, the other filaments of lamps 83 and 86 will be energized while lamps 84 and 85 will remain deenergized.

Assuming now that the engine 72 is not in operation and that the actuator 46 is in the position illustrated in FIGURE 1, the light switch may be shifted to provide for energization of the tail and parking lights or for energization of the tail and head lamps while the motor vehicle is at rest. This is accomplished by grasping the knob 42 and pulling the movable member 26 into the various positions illustrated in FIGURE 3. When the knob is pulled leftwardly in FIGURE 1, the spherical end portion 44 of the rod 40 snaps past the spring fingers 48 and 50. The compressive force of the spring 60 and the resilience of the spring fingers 48 and 50 are designed to permit the spring fingers to snap over the spherical portion 44 of the rod when the rod is moved leftwardly under manual actuation.

If the movable member 26 of the switch is moved to a position wherein fixed contacts 14 and 16 are connected and contacts 20 and 22 are connected, the head lamps will be energized together with the tail lamps and panel lamps. If the engine of the vehicle is now started, the diaphragm 54 will be moved leftwardly and the actuator 46 will be moved leftwardly and will, near the end of its movement, snap over the spherical portion 44. The final position of the actuator 46 with the engine running is illustrated in phantom lines in FIGURE 1. It, thus, can be seen that, if the actuator 26 is moved fully leftwardly and the engine started, the parts will be in such a position that the actuator 46 will be at the left hand side of the spherical end portion 44 of the rod 40. If the engine is now turned off, the diaphragm 54 will move rightwardly and the actuator 46 will engage the rod end 44 tending to move the contact carrier 26 of the switch to an "off" position. The spring 60 has sufficient compressive force and the spring fingers 48 and 50 are designed to overcome the detent 32 whenever the switch is being moved to its "off" position by the vacuum motor. It, thus, is seen that, when the head lamps are "on" and when the engine is turned off, the lamps of the lighting system are automatically extinguished.

If the contact carrier 26 had been manually moved to a position wherein the detent 32 became engaged in detent recess 36 to cause an energization of the parking lamps, the starting of the engine and leftward movement of the actuator 46 will cause the switch part 26 to be moved to a position wherein the head lamps become energized. Under this conditions, as the spring actuator 46 moves leftwardly, it will encounter the spherical end 44 of the rod 40. The actuator 46 will then move the contact carrier 26 fully leftwardly to a position wherein the head lamps become energized. It, thus, can be seen that operation of the engine of the motor vehicle causes the switch to be shifted from a position wherein the parking lamps are energized to a position wherein the head lamps are energized. It, of course, will be appreciated that, when the movable member 26 is moved to a position wherein the enlarged portion 95 of the rod 40 engages the end wall 96 of base 12, the continued movement of spring actuator 46 will cause it to once more snap over the spherical portion 44 of the rod and it will be in a position to return the switch to an "off" position when the engine is shut down.

If the engine is started before the movable part 26 of the switch is actuated, the spring actuator 46 moves fully leftwardly and the switch may then be manually actuated without contact between the spherical member 44 with the spring actuator 46 until the engine is turned off. It is to be appreciated that the movable contact carrier 26 is held in its various positions by engagement of the detent 32 in the detent recesses 34, 36 and 38 and is moved to an "off" position by actuator 46. It will be apparent that the movable member 26 is not moved back to the position of FIGURE 1 immediately upon turning off the engine as there is some time delay dictated by the adjustment of valve member 68. This time delay is sufficient to prevent premature deenergization of the lamps of the motor vehicle lighting circuit in case the engine should become temporarily inoperative on the highway due to some faulty condition of the engine. It will, of course, be appreciated that the light switch may always be manually actuated regardless of the position of spring fingers 48 and 50 since the spring fingers snap over the spherical portion 44 upon applying sufficient pull on the manual actuator 42.

While the embodiments of the present invention as herein disclosed constitute preferred forms, it is to be understood that other forms might be adopted.

What is claimed is as follows:

1. A light control system for a motor vehicle having an engine comprising, a voltage source, a plurality of lamps, an electric switch having a movable part that is shiftable to a plurality of positions, manually operable means for shifting said movable part, means shiftable in response to a condition of operation of said engine, and force responsive releasable means connecting said last-named means and the movable part of said switch whereby said last-named means moves said movable part.

2. In a motor vehicle lighting system, the combination comprising, an electric switch having a movable member, manually operable means for shifting said movable member, a vacuum motor having a movable member, and force responsive releasable connecting means connecting said movable members.

3. In a light control system for a motor vehicle, the combination comprising, an electric switch having a movable member shiftable to a plurality of positions, a switch rod connected with said movable member having a spherically-shaped portion, a vacuum motor having a shiftable diaphragm, and a rod member connected with said diaphragm having a pair of spring fingers cooperating with the spherical portion of said switch rod member, said spring fingers being adapted to snap over said spherical portion when said movable member is manually actuated.

4. In a light control system for a motor vehicle, the combination comprising, an electric switch having a movable member shiftable to a plurality of positions, a vacuum motor having a movable member, and means connecting the movable member of said switch and the movable member of said vacuum motor in such a manner that the movable member of said switch may be moved relative to the movable member of said vacuum motor, said last-named means causing said movable member of said vacuum motor and the movable member of said switch to move together in one direction of movement of said vacuum motor.

5. In a light control system for a motor vehicle, the combination comprising, a voltage source, a plurality of lamps, an electric switch having a member movable to an "off" position wherein said lamps are disconnected from said voltage source and to an "on" position wherein said lamps are connected with said voltage source, a vacuum motor having a member shiftable between two positions, means connecting the movable member of said vacuum motor and the movable member of said switch for joint movement when said vacuum motor shifts said movable switch member from its "on" position to its "off" position, and means for disconnecting the movable member of said switch and the movable member of said vacuum motor when the movable member of the switch is being moved from its "off" position to its "on" position.

6. A light control system for a motor vehicle comprising, a voltage source, a plurality of lamps, an electric switch having a movable member shiftable from a first position wherein said lamps are disconnected from said voltage source to a second position wherein said lamps are connected with said voltage source, a vacuum motor having a movable actuator, means connecting said movable actuator and the movable member of said switch whereby said movable member is moved from said second position to said first position when said vacuum motor is disconnected from a vacuum source, and means permitting the movable member of said switch to move relative to the actuating member of said vacuum motor when said movable member is being moved manually.

References Cited in the file of this patent

UNITED STATES PATENTS

| | | |
|---|---|---|
| 1,991,939 | Howsam | Feb. 19, 1935 |
| 2,045,274 | Kundig | June 23, 1936 |
| 2,337,788 | White | Dec. 28, 1943 |
| 2,480,370 | Jaynes | Aug. 30, 1949 |